(12) United States Patent
Vakil et al.

(10) Patent No.: US 8,121,600 B2
(45) Date of Patent: Feb. 21, 2012

(54) WIDE AREA MOBILE COMMUNICATIONS OVER FEMTO-CELLS

(75) Inventors: Faramak Vakil, Long Grove, IL (US); Dragan M. Boscovic, South Barrington, IL (US); Samuel D. Glazer, New York, NY (US); Surender Kumar, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 425 days.

(21) Appl. No.: 12/345,746

(22) Filed: Dec. 30, 2008

(65) Prior Publication Data

US 2010/0167740 A1    Jul. 1, 2010

(51) Int. Cl.
*H04W 36/00* (2009.01)
(52) U.S. Cl. .......................... 455/436; 455/441; 370/331
(58) Field of Classification Search .................. None
See application file for complete search history.

(56) References Cited

U.S. PATENT DOCUMENTS

| | | | |
|---|---|---|---|
| 5,459,727 A | 10/1995 | Vannucci | |
| 5,513,184 A | 4/1996 | Vannucci | |
| 6,104,513 A | 8/2000 | Bloom | |
| 6,393,106 B1 | 5/2002 | Cannon et al. | |
| 6,667,759 B2 | 12/2003 | Gerszberg et al. | |
| 7,042,871 B2 | 5/2006 | Gallant et al. | |
| 7,127,045 B1 | 10/2006 | Yoon et al. | |
| 7,162,013 B2 | 1/2007 | Gavette et al. | |
| 7,277,410 B2 | 10/2007 | Horneman | |
| 7,417,982 B2 | 8/2008 | Jain et al. | |
| 2001/0036834 A1* | 11/2001 | Das et al. ........................ 455/458 |
| 2004/0131025 A1 | 7/2004 | Dohler et al. | |
| 2004/0139228 A1 | 7/2004 | Takeda et al. | |
| 2005/0073574 A1 | 4/2005 | Krisbergh et al. | |
| 2005/0180553 A1 | 8/2005 | Moore | |
| 2005/0201304 A1 | 9/2005 | Olshansky | |
| 2006/0136557 A1 | 6/2006 | Schaedler et al. | |
| 2006/0274741 A1 | 12/2006 | Wing et al. | |
| 2007/0002775 A1 | 1/2007 | Belling | |
| 2007/0036143 A1 | 2/2007 | Alt et al. | |
| 2007/0043829 A1 | 2/2007 | Dua | |
| 2007/0058537 A1 | 3/2007 | Belling | |
| 2007/0071221 A1 | 3/2007 | Allen et al. | |
| 2007/0078986 A1 | 4/2007 | Ethier et al. | |

(Continued)

FOREIGN PATENT DOCUMENTS

EP            126738 B1        7/2007

OTHER PUBLICATIONS

"Flooding Algorithm", Wikipedia, accessed at http://en.wikipedia.org/wiki/Flooding_algorithm, on May 19, 2008.

(Continued)

*Primary Examiner* — Ajit Patel
(74) *Attorney, Agent, or Firm* — Stewart M. Wiener

(57) ABSTRACT

A method and apparatus is provided for hand-off of a mobile User Equipment (UE) across a femto cellular network. The method includes dynamically clustering a plurality of neighboring femto cells in a vicinity of a first femto cell to which a mobile UE is currently attached. The dynamic cluster of neighboring femto cells is moved across the femto cellular network in accordance with movement of the mobile UE across the femto cellular network.

18 Claims, 6 Drawing Sheets

U.S. PATENT DOCUMENTS

| | | | |
|---|---|---|---|
| 2007/0081518 A1 | 4/2007 | Jain et al. | |
| 2007/0088836 A1 | 4/2007 | Tai et al. | |
| 2007/0097983 A1 | 5/2007 | Nylander et al. | |
| 2007/0183427 A1 | 8/2007 | Nylander et al. | |
| 2007/0189311 A1 | 8/2007 | Kim et al. | |
| 2007/0195755 A1 | 8/2007 | Li et al. | |
| 2007/0195805 A1 | 8/2007 | Lindgren | |
| 2007/0211695 A1 | 9/2007 | Shi et al. | |
| 2007/0254620 A1 | 11/2007 | Lindqvist et al. | |
| 2007/0254634 A1 | 11/2007 | Costa-Requena et al. | |
| 2007/0270152 A1 | 11/2007 | Nylander et al. | |
| 2007/0294411 A1 | 12/2007 | Hakkarainen | |
| 2008/0045214 A1 | 2/2008 | Wen et al. | |
| 2008/0056465 A1 | 3/2008 | Ruckart | |
| 2008/0075262 A1 | 3/2008 | Wood et al. | |
| 2008/0159488 A1 | 7/2008 | Raja | |
| 2008/0212594 A1 | 9/2008 | Shaikh et al. | |
| 2008/0244610 A1 | 10/2008 | Zhang et al. | |
| 2008/0259909 A1 | 10/2008 | Runeson et al. | |
| 2008/0270618 A1 | 10/2008 | Rosenberg | |
| 2009/0296635 A1* | 12/2009 | Hui et al. | 370/328 |
| 2010/0027694 A1* | 2/2010 | Touboul et al. | 375/260 |
| 2010/0093354 A1* | 4/2010 | Agashe et al. | 455/436 |
| 2010/0113036 A1* | 5/2010 | Cho et al. | 455/444 |
| 2010/0159960 A1* | 6/2010 | Chou et al. | 455/458 |
| 2010/0167732 A1 | 7/2010 | Vakil et al. | |
| 2010/0197311 A1* | 8/2010 | Walldeen et al. | 455/444 |

OTHER PUBLICATIONS

"Femtocell", Wikipedia, accessed at http://en.wikipedia.org/wiki/Femto_cell on Feb. 6, 2008.

"Universal Mobile Telecommunications System", Wikipedia, accessed at http://en.wikipedia.org/wiki/UMTS on Feb. 6, 2008.

"Session Initiation Protocol", Wikipedia, accessed at http://en.wikipedia.org/wiki/Session_Initiation_Protocol on Feb. 6, 2008.

"GSM", Wikipedia, accessed at http://en.wikipedia.org/wiki/GSM on Feb. 6, 2008.

"UMA: The 3GPP Standard for Femtocell-to-Core Network Connectivity", A Kineto White Paper, Aug. 2007.

Greene et al., "Over the Top Services", Article for Pipeline Magazine, Dec. 2007.

* cited by examiner

THE ARCHITECTURE OF THE ECONS NETWORK

WIDE AREA MOBILE COMMUNICATIONS OVER FEMTO-CELLS

FIELD OF THE INVENTION

The invention relates to a system and method for supporting mobile communications over femto-cells as an alternative to conventional macro cells and in particular, to a system and method for supporting such communications in a communication system having an Internet Protocol (IP) multimedia subsystem (IMS).

BACKGROUND OF THE INVENTION

Due to users' increasing demand for perpetual and ubiquitous access to the Internet, the end-to-end wireless/wireline communications network is gradually migrating towards a flexible wireless and wireline IP infrastructure that supports heterogeneous multimedia (e.g., voice, video, data and the like) services in an economical manner. Thus, the Third Generation Partnership Project (3GPP) has been developing the specifications and architecture of an IP multimedia subsystem (IMS) that augments the existing circuit switched & 2G/3G wireless systems and expedites their gradual migration to an all IP infrastructure. IMS is built upon the open standard IP protocols defined by the IETF (Internet Engineering Task Force). It aims to serve as a ubiquitous IP service control and delivery platform for supporting all current services that existing circuit switched networks and the Internet offer as well as providing a vehicle for development and deployment of new services and applications in future.

The IMS technology defined by the 3GPP to provide IP Multimedia services over 3G mobile communication networks is set forth in 3GPP TS 23.228, Release 7 and TS 24.229 Release 8, which are hereby incorporated by reference in their entirety. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and web servers). SIP is an example of an application level signaling protocol used by an initiating device to locate another device in order to establish a communication session. The Session Description Protocol (SDP), carried by SIP signaling messages, is used to describe and negotiate the media components of the session. Other protocols are used for media transmission and control, such as Real-time Transport Protocol and Real-time Transport Control Protocol (RTP/RTCP), Message Session Relay Protocol (MSRP), Hyper Text Transfer Protocol (HTTP).

FIG. 1(a) depicts the simplified layered architecture of a standard IMS, showing the transport, control, and applications layers of the network. The transport layer transfers bits and packets of information across the end-to-end platform, which comprises a set of heterogeneous networks including, but not limited, to the existing public switched telephone network-(PSTN), the Internet, a 2G/3G cellular network, a WLAN (wireless local area networks), and so on.

The IMS control layer is responsible for setting up sessions and allocating necessary resources for supporting users' services and applications. The IMS control layer primarily comprises the home subscriber server (HSS), call server control function (CSCF), and a set of edge controllers. The HSS, which stores and manages user subscription data, includes the IMS authentication, authorization, & accounting-(AAA) server as well as its master user profile database. Essentially, the HSS provides the functions of a master AAA and its profile database, very much equivalent to those of the home location registrar (HLR) and the Authentication Center (AuC) in GSM networks. The CSCF entity, which implements the session initiation protocol (SIP), is the session management and call control engine of the IMS. A CSCF also acts as a SIP registrar receiving registration information (e.g., public identity, private identity, contact, etc.), and stores them in the HSS that serves as a master AAA and user profile server. The IMS edge controllers are entities that facilitate the interworking of the IMS subnet with the existing wireless and wireline networks.

The IMS application layer includes a set of application servers (ASs) where an AS hosts and executes one or more IMS services/applications. The CSCF uses SIP to interact with ASs and vice-versa.

The 3GPP has adopted a highly centralized architecture in the development of the IMS specifications. It uses centralized application servers to support the various services/applications and a centralized platform to provide control layer functions (e.g., presence, AAA, and mobility management) necessary for running applications or offering services. In addition, centralized call controllers are used for session origination/modification/termination, quality of service control, and collecting charging data records. A key strength of IMS, its network-centric centralized architecture, is also the source of its main shortcomings. On the one hand, it allows the IMS to serve as a platform for efficiently supporting many services. On the other hand, it makes the introduction of IMS into legacy networks quite complex and costly. Moreover, the scalability, resiliency, and management flexibility of IMS are suboptimal.

To alleviate the shortcomings of the centralized IMS approach while supporting identical or at least similar services, US Patent Publication No. US 2008-0235778 A1 and US Patent Publication No. US 2008-0235185 A1 set forth a distributed architecture comprising an interconnected set of Edge Convergence Server (ECONS) customer premises equipments (CPEs). Hereafter, the said distributed architecture is referred to as ECONS architecture, the CPEs are referred to as ECONS CPEs, and the resulting IP multimedia communication network is referred to as ECONS system or ECONS network, interchangeably.

The tenet of ECONS architecture is to move most of the functions of the IMS application and control layers, as appropriate, into ECONS CPEs, which are distributed across the subscribers' homes and premises. Such a distributed architecture can reduce the cost of introducing IMS into legacy networks and improve the scalability, flexibility and resiliency of the overall system.

FIG. 1(b) depicts the simplified layered architecture of the ECONS approach in which many of the functions of the application layer and the control layer are moved to the ECONS CPEs at the user premises. The ECONS architecture is designed to provide an operator with a decentralized, low cost, scalable solution to deliver voice and multimedia services to its customers. Instead of relying on a costly and complex centralized core network, the ECONS architecture pushes the intelligence to the edge of the network by deploying ECONS CPEs on the subscriber's premises. The ECONS CPE provides session control functions and application servers, while the core network is limited to providing AAA services for the CPEs, and gateways to other networks. The functional ECONS CPE may be embodied in a residential gateway, set top box, media center or the like.

The following description sets forth some of the main characteristics of the ECONS architecture. First, the ECONS is a distributed networking system. Instead of relying on a centralized core network, the main functionality of the ECONS system is provided by the ECONS CPE. The ECONS CPEs provide user registration and session management, authentication, media gateway, application servers and call control functions for user equipments (UEs) such as cell phones and the like. The core network provides authentication for CPEs and interworking functions with other networks. Second, the ECONS architecture is scalable. As the number of subscribers increases, so does the number of deployed CPEs, thus growing as required. Third, the ECONS architecture can operate in a peer to peer as well as client server manner. Whenever possible, the communication happens at the edge of the network with minimal intervention by the network core. Signaling and media are transferred directly between CPEs, without being relayed by the core network. Fourth, the ECONS architecture provides advanced functions to its users with minimal involvement of its core network. In particular, several UEs can be associated with the same CPE. Fifth, as in IMS, the session management and control in ECONS system is performed using the SIP protocol. An ECONS system can interoperate with other SIP networks, including IMS.

In summary, an ECONS system is a distributed IP-centric control and signaling platform comprising a set of CPEs residing at the subscribers' premises which provides voice, video, data, and multimedia services to fixed and mobile subscribers. Each ECONS CPE comprises presence, location, session management, resource management, AAA, NAT traversal, CPE management enablers as well as the standard TCP/IP stack, and possibly a DSL/Cable modem for access to the Internet. The CPE is controlled and possibly owned by the operator rather than the subscriber.

FIG. 2 depicts the functional architecture of an ECONS network 200. It should be emphasized that in this implementation the circuit switched network 220 and the broadband IP network 230 both belong to and are operated by the same operator. The ECONS network comprises a set of ECONS CPEs 210 connected to the operator's core network. The ECONS core network comprises the operator's circuit switched and broadband IP networks 220 and 230. An individual ECONS CPE 210 may be connected to the operator's broadband IP network 230 or to both its broadband IP network 230 and its circuit switched network 220. Although the ECONS architecture envisions moving most of the control and application layers functions of IMS into ECONS CPEs, it still maintains in the core network a set of common functions that operators deem essential to proper operation and security of the network (e.g., AAA server, NAT traversal, etc.).

More specifically, the functional entities in the ECONS network are the ECONS CPE 210 and the operator's control platform 240 in its core network. The operator's control platform of the ECONS core network includes a RENDEZVOUS server 242, a NAT traversal server 270, a DNS server 246, a SIP proxy 248, a VoIP gateway 250 and an authentication, authorization, and an accounting (AAA) server 252.

The ECONS CPE 210 is the central entity of the system 200. It comprises a SIP-based session manager, a policy repository, and application servers such as a presence server, web server, etc. The session manager of the ECONS CPE may control every communication flow initiated or received by the UE 260. It may add or drop call/session legs, route sessions to any endpoint, and seamlessly move a session to any end points. The ECONS CPE 210 provides control over all audio and video sessions of the UEs 260. It is responsible for routing SIP signaling to other ECONS CPEs as well as to other SIP devices. It also provides a local proxy/registrar for SIP based UEs, and the gateway functionality for POTS (plain old telephone service) equipments. It may also include some application servers, such as a presence server. It is important to note that the ECONS CPE 210 is installed in the user's home network. It may include a broadband modem, in which case it is connected directly to the broadband network. It can also be connected through an Ethernet link to an external broadband modem, which may implement a network address translator (NAT) 270. In this case the ECONS CPE 210 provides the necessary mechanisms for NAT traversal for SIP signaling and media.

The rendezvous server 242 of the ECONS core network provides a simple way for a CPE to reach any other CPE in the system. Every ECONS CPE 210 maintains an active connection with the RENDEZVOUS server 242. This connection can be used to send a short message to any other ECONS CPE. It is mainly used for NAT traversal. When two ECONS CPEs 210 want to establish a SIP session, they determine their public IP addresses using STUN (Simple Traversal of UDP thru NATs) protocol, and then they send their public addresses to each other through the RENDEZVOUS server 242. After these addresses have been exchanged the rest of the communication is done directly between the CPEs without the intervention of any other node.

The STUN server 244 is the NAT Traversal that supports the STUN protocol and the relay usage of that protocol The STUN protocol is used by a node behind a NAT (which in the case of ECONS is an ECONS CPE) to find its own public address, determine the NAT type and the Internet side port associated by the NAT with a particular local port. The STUN server 244 also supports the relay usage. In the relay usage the server allocates a public IP address and port that the client can use for communications through the NAT. Note that in the relay usage data has to be relayed through the core of the network, which is, of course, less efficient. The detailed specifications of STUN are presented in RFC 3489.

The DNS server 246 of the provider's control platform 240 includes entries identifying the SIP servers for the provider's domain, an ENUM database, and the list of available STUN servers. Note that "ENUM" is a protocol that resolves fully qualified telephone numbers to fully qualified domain name addresses using a DNS-based architecture. The DNS specifications are set forth in RFC 1034 and RFC 1035.

The SIP proxy 248 is used to route SIP signaling between external networks and the ECONS CPEs. The SIP proxy 248 can receive SIP requests from non-ECONS SIP devices and route them to the appropriate ECONS CPE. The SIP specifications are set forth in RFC 3261.

The VoIP gateway 250 provides signaling and media gateway functionalities to interwork the circuit switched network with the ECONS network.

The AAA server 252 provides AAA services for the ECONS CPEs. It comprises an ECONS profile server as well as AAA engine that authenticates the CPEs. It also stores the billing records resulting from calls to the circuit switched domain. In principle, the AAA server 252 functionality is equivalent to those of a HSS in a centralized IMS.

Cellular operators deploy low power base stations at subscribers' premises to improve their indoor cellular coverage. These base stations are often referred to as femto cells in the cellular industry generally and as Home NodeBs in the 3GPP community in particular. These femto cells are attached to the cellular operator's core network and its centralized IMS services. Three options are currently considered for femto cell connectivity to the core network: Iu-b over IP, RAN Gateway, and SIP/IMS. First, the Iu-b over IP option uses the existing 3GPP Iu-b interface to leverage the cellular operators' 3G Radio Node Controllers (RNCs) to support these femto cells, through a remote gateway along with the 3G NodeBs (i.e., 3G BTSs). Note that the Iu-b interface is primarily proposed for connection of 3G NodeBs with 3G RNCs. Second, the RAN Gateway approach uses a network controller residing between the cellular operator's core network and its IP access network to connect the femto cells to the cellular core network. Third, the SIP/IMS solution proposes to use SIP between femto cells and the IMS core of the cellular operator.

As the number of femto cells increases the cellular operator will eventually have in place two parallel wireless infrastructures that overlap in coverage: a series of conventional cells that each, for example, cover a distance of about 3 to 5 kms and a series of femto cells that each, for example, cover a distance of about 30-100 m. The conventional cells will be referred to herein as macrocells to distinguish them from the femto cells. Of course, the coverage offered by the femto cell infrastructure will be more complete and more fully overlap with the macrocellular infrastructure in dense metropolitan areas than in less densely populated areas. In such densely populated areas, or in an enterprise environment such as a corporate or university facility or campus, the cellular operator may be able to use the femto cell infrastructure as an alternative wireless platform to the macrocellular infrastructure.

One problem with using the femto cell infrastructure in this manner is ensuring seamless mobility (i.e., seamless hand-off of the UE) of the user across the femto cell infrastructure. To ensure such a seamless mobility or hand-off the UE will need to be authenticated (or re-authenticated) each time it moves from one femto cell to another. In addition, the packets destined for the UE should be forwarded to the UE as it changes its point of attachment to the network from one femto cell to another femto cell.

These processes, particularly the authentication (re-authentication) of the UE, are problematic because the amount of time it may take a user equipped with a UE to move (e.g., by walking) from femto cell to femto cell may be about the same or less than the amount of time needed by conventional hand-off techniques to transition a UE from one femto cell to another. Clearly, conventional hand-off techniques generally will not be suitable for use with a femto cell infrastructure.

SUMMARY OF THE INVENTION

In accordance with the present invention, a method is provided for hand-off of a mobile User Equipment (UE) across a femto cellular network. The method includes dynamically clustering a plurality of neighboring femto cells in a vicinity of a first femto cell to which a mobile UE is currently attached. The dynamic cluster of neighboring femto cells is moved across the femto cellular network in accordance with movement of the mobile UE across the femto cellular network.

In accordance with another aspect of the invention, A Customer Premises Equipment (CPE) is provided that includes a wireless transceiver for establishing communication with a mobile User Equipment (UE) over a first femto cell to which the femto cell is currently attached. The CPE also includes a network interface for establishing communication with a cellular network and a session manager configured to forward an authentication message over a broadband network. The authentication message includes information needed to authenticate and attach the UE to a plurality of femto cells neighboring the first femto cell so that the UE is authenticated by the neighboring femto cells without physically entering a geographic area served by the neighboring femto cell.

DETAILED DESCRIPTION OF THE INVENTION

Figure 3:
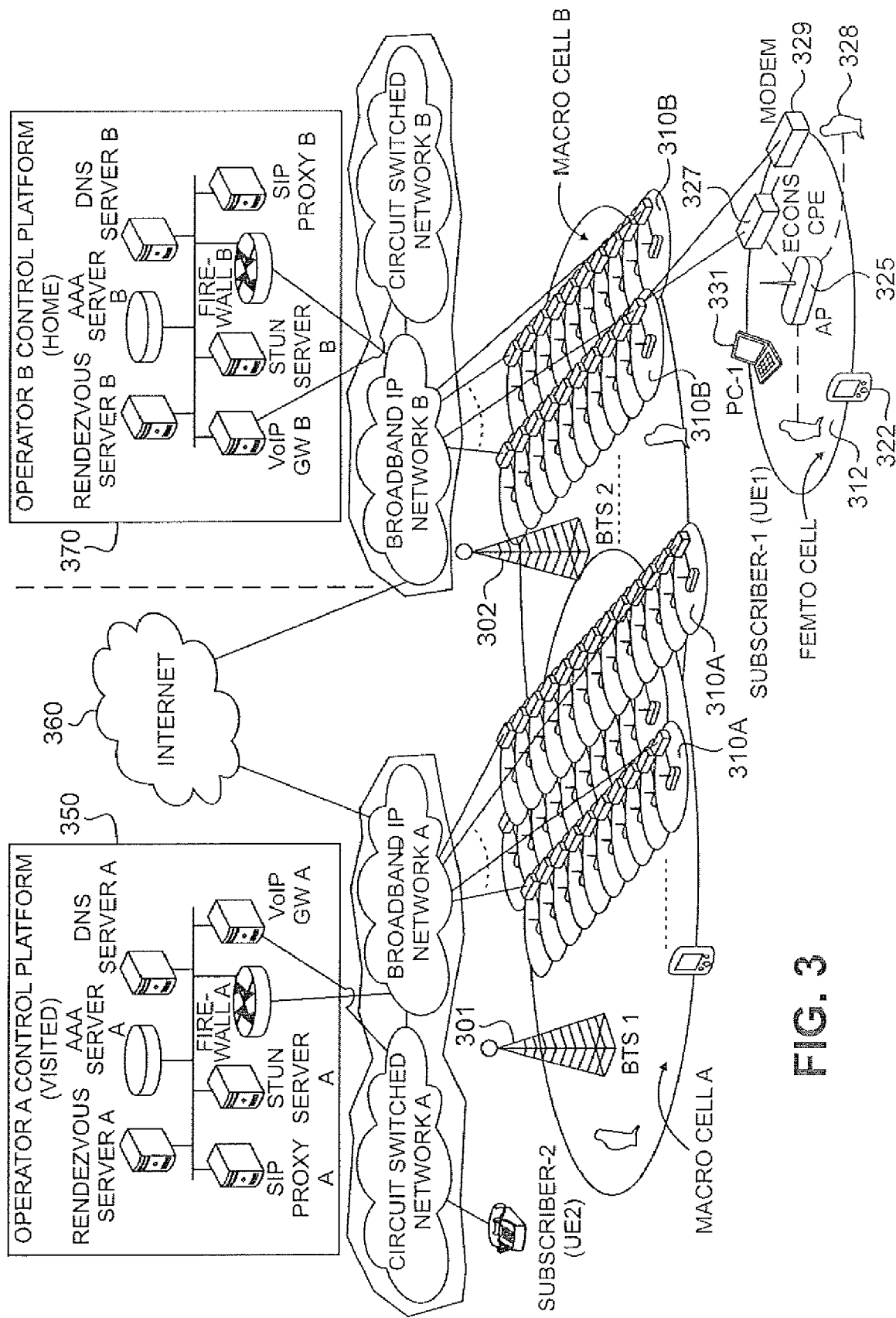
FIG. 3 illustrates the architecture of an ECONS system that includes subscriber femto cells.

FIG. 3 depicts a simplified architecture of an end-to-end ECON mobile communication network comprising the ECONS mobile communication infrastructures and control platforms of two operators, operators A and B, including their subscribers' femto cells. In this example each operator has deployed an ECONS distributed platform instead of a centralized IMS for providing IMS services.

The operator A has a cellular network A comprising a core network A and its companion wireless access network. The cellular core network A of operator A includes a circuit switched network A and a packet switched broadband IP network A, as well as a signaling and control platform 350. Its wireless access network includes a set of base transceiver stations (BTSs), each covering a macro cell area. In FIG. 3, one such macro cell of operator A is depicted, which is denoted macro cell A and which is being served by BTS 301. The BTSs of wireless access network of operator A are typically attached by wired links to the cellular core network A of operator A. Similarly, operator B has a cellular network B comprising a cellular core network B and its companion wireless access network. The core network B of operator B includes circuit switched network B and a packet switched broadband IP network B, as well as a signaling and control platform 370. Its wireless access network includes a set of base transceiver stations (BTSs), each covering a macro cell area. In FIG. 3, one such macro cell of operator B is depicted, which is denoted macro cell B and which is being served by BTS 302. The BTSs of wireless access network of operator B are typically attached by wired links to the cellular core network B of operator B. Also shown in FIG. 3 is a broadband network such as the Internet 360, which is connected to the core network A of operator A as well as the core network B of operator B.

A femto cell is an indoor low power cellular base station with a relatively small footprint, which typically resides within the subscriber's premises (e.g., residence). A femto cell usually supports about half dozen mobile devices, and may cover an entire premises or a part of it. FIG. 3 shows a series of femto cells 310A associated with the subscribers of operator A and a series of femto cells 310B associated with operator B whose areas of coverage overlap in part with the macro cell areas served by BTS 301 of cellular network A and by BTS 302 of cellular network B.

Figure 1:
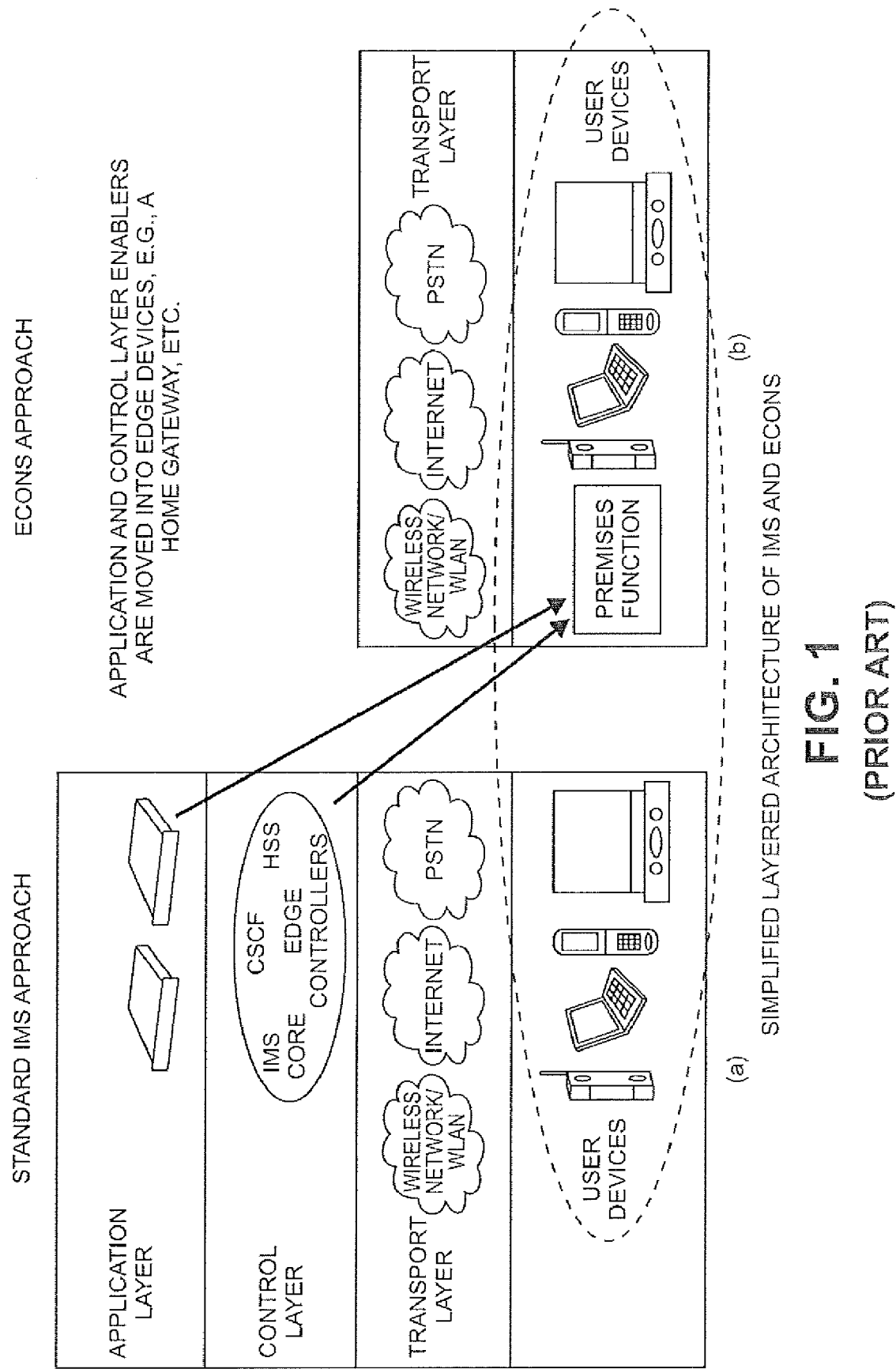
FIG. 1 illustrates the layered architecture of an IMS and an ECONS system.
Figure 2:
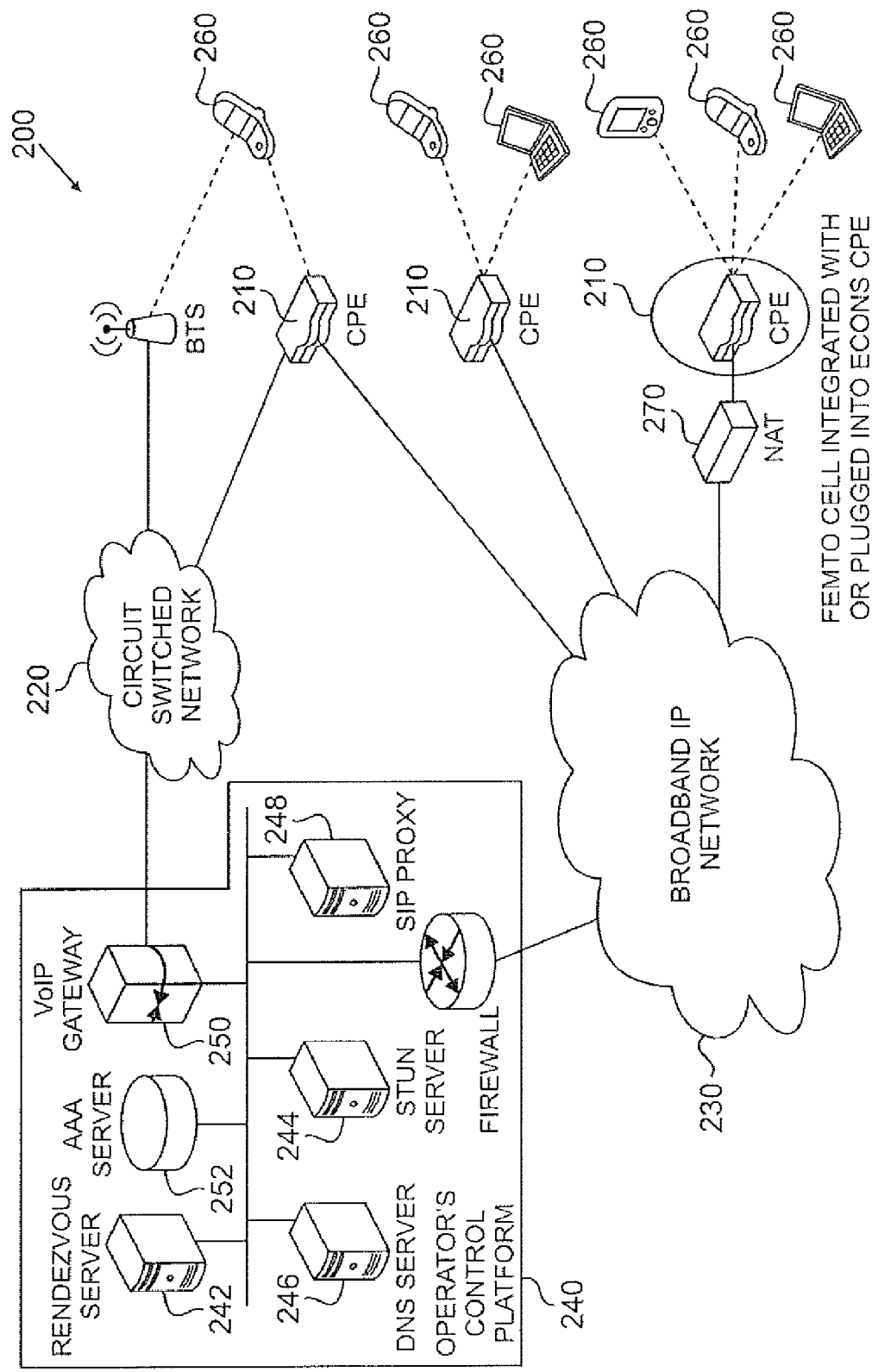
FIG. 2 illustrates the functional architecture of an ECONS system where both broadband IP and circuit switched networks are owned and operated by the same operator.

A detailed view of one of the femto cells 310 (e.g., one of the femto cells 310B), denoted femto cell 312, is also shown in FIG. 3. The femto cell base station 325 communicates with the subscriber's ECONS CPE 327, which in turn communicates with the Internet 360 or other broadband network thru the subscriber's broadband modem 329 such as a DSL or cable modem. When the femto cell is located in the subscriber's premises, the subscriber's wireless devices or UEs such as PC 331 and PDA 322, and cell phone 328 will generally attach to the femto cell base station 325 of femto cell 312 because its indoor coverage and performance is most likely better than those of the macro cellular network. Thus, all messages from (or to) the subscriber's wireless devices at her/his premises traverse through the femto cell 325. It should be noted that the femto cell base station and the broadband modem may be integrated with the ECONS CPE (as indicated in FIG. 2) or, alternatively, they may remain as separate devices (as indicated in FIG. 3).

The ECONS CPE 327 serves as the femto cell controller and, during communication sessions, is situated in the route or path to and from the femto cells. When the ECONS CPE is attached to the broadband modem of the broadband service provider, the ECONS CPE can acquire for itself from the broadband network's DHCP server (not shown in FIG. 3) the default gateway, SIP out bound proxy, DNS addresses and an IP address.

Figure 4:
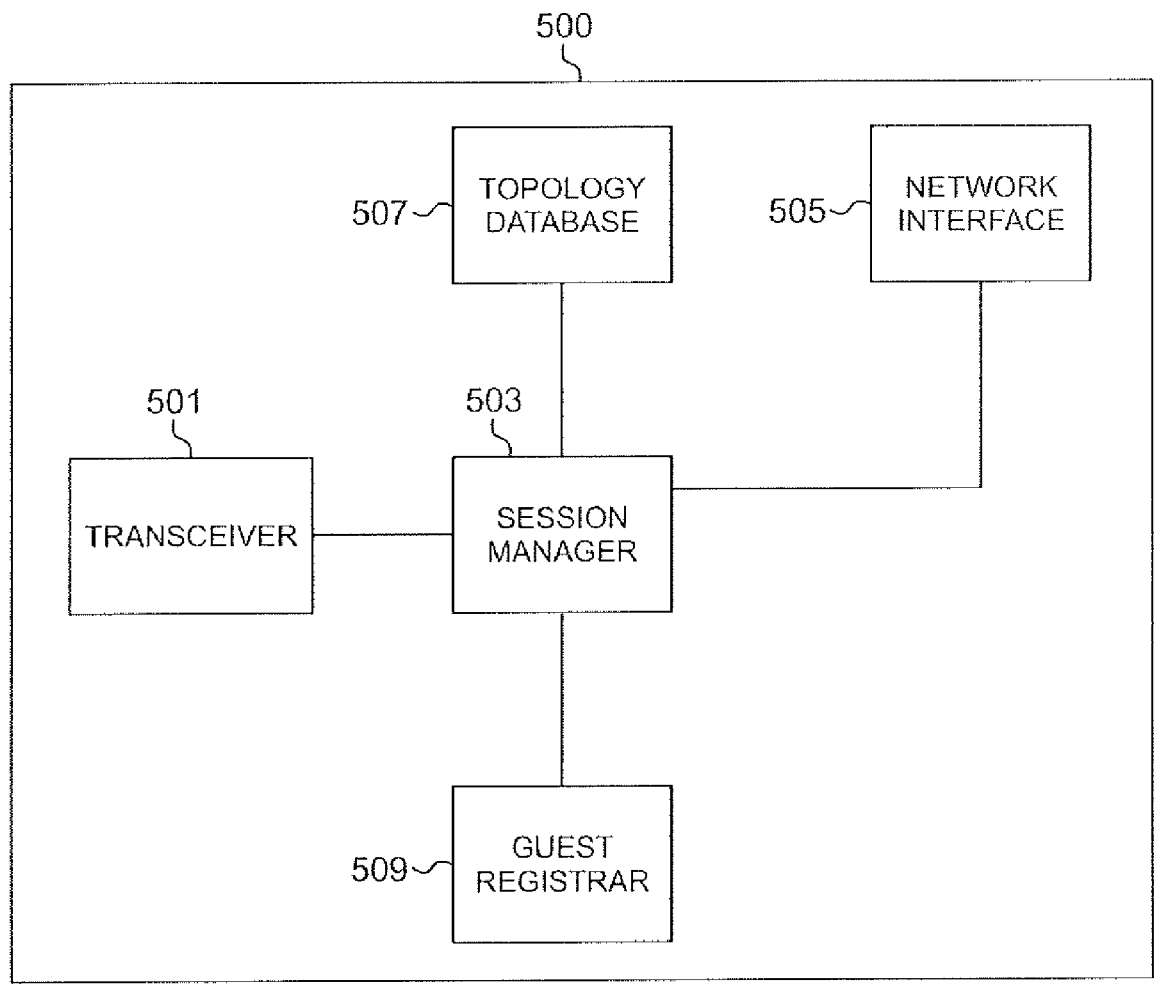
FIG. 4 illustrates one example of an ECONS CPE.

FIG. 4 shows one example of an ECONS CPE 500. The CPE 500 includes a transceiver 501, session manager 503, and a broadband network interface 505. The transceiver 501 is capable of communicating with the user's UE over the air interface of the femtocell. The transceiver 501 is coupled to a session manager 503, which may include a SIP server which interfaces a SIP client to the UE to set up new communication sessions, terminate existing sessions, etc. The session manager 503 is furthermore capable of exchanging data of the communication session with the UE using a suitable protocol. The ECONS CPE communicates with the broadband IP network of one of the operators A or B via its network interface 505. In some cases, the network interface 505 of the ECONS CPE 500 may be a broadband modem. Furthermore, the ECONS CPE includes a topology database 507, and a guest registrar 509. The topology database 507 contains a list of neighboring femto cells as well as overlapping macro cells in the vicinity of the subscriber's premises/residence. The guest registrar 509 is a database containing the identities and the security credentials of the UEs that are already authenticated and granted access to the femto cell attached to the ECONS CPE 500.

As FIG. 3 indicates, the cellular operators A and B who have dispensed the femto cells 310A and 310B to their mobile subscribers each ends up with a femto cell network that parallels and complements its macro cellular network. These operators may use these femto cell networks as alternatives to the wireless access networks of their macro cellular infrastructures. In this way each operator can unload traffic onto its femto cells and away from the scarce spectrum of its macro cellular network.

As previously mentioned, conventional hand-off techniques generally will not be suitable for use with a femto cell infrastructure because the time it takes to a UE to detach from one femto cell and attach to the next may be comparable to (or more than) the amount of time it takes the UE to traverse a femto cell and enter into an adjacent or neighboring femto cell, thus causing unacceptable disruptions in service since the user may have exited a femto cell before the attachment process is complete. To overcome this problem a user-centric cell is created which comprises a group of adjacent femto cells. The femto cell in which the user is located at any given time defines the center of the user-centric cell. As the user moves from one femto cell to another, the user-centric cell moves along with her so that the user-centric cell is always centered about the user. The concept of a user-centric cell will be further illustrated with reference to FIG. 5.

Figure 5:
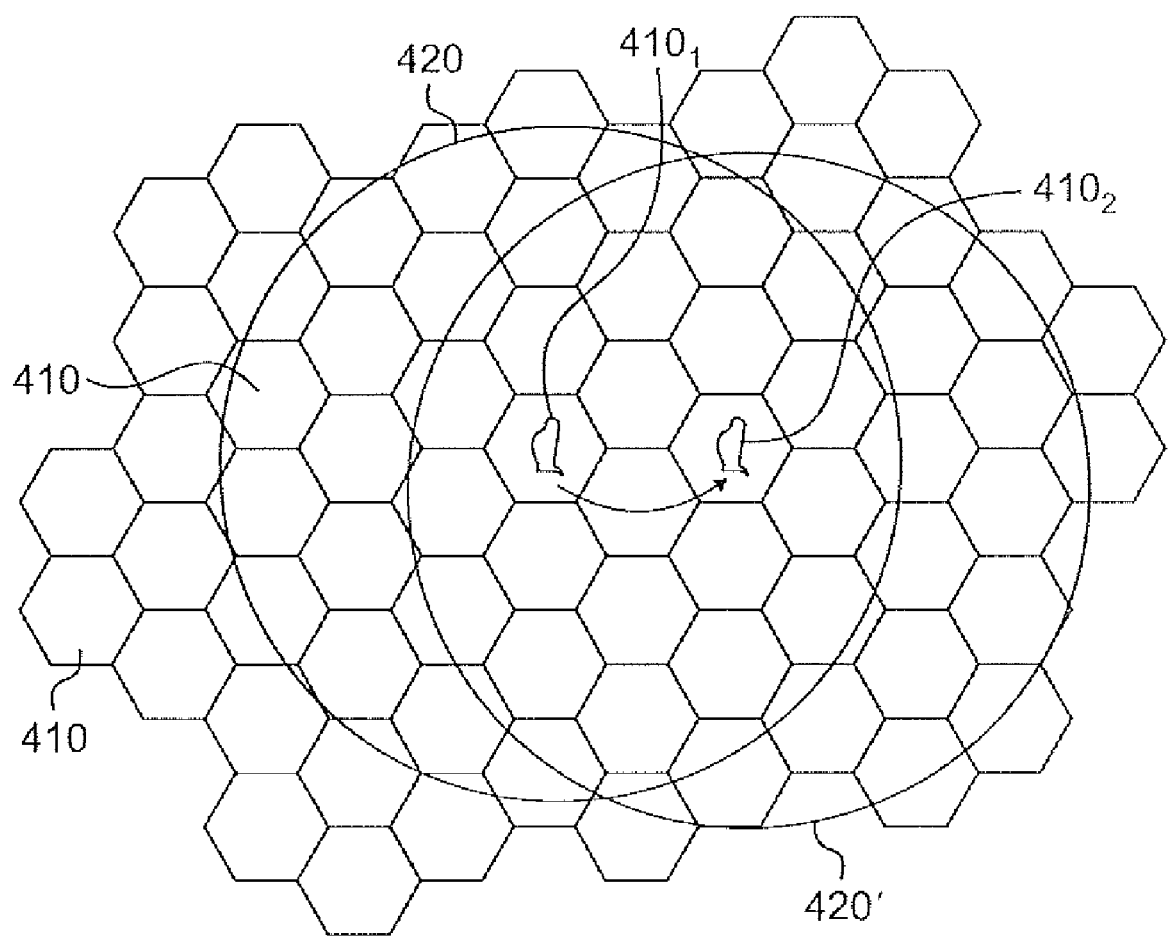
FIG. 5 illustrates a user-centric cell that comprises a series a neighboring femto cells.

FIG. 5 shows a plan view of a group of femto cells 410. The user is initially located in and attached to femto cell $410_1$. The user-centric cell 420 is centered about the femto cell $410_1$ and has a radius of N femtocells, where in this example N=3. As the user moves m femto cells from femto cell $410_1$ to femto cell $410_2$, the user-centric cell 420 shifts with her so that the new user-centric cell 420' is centered about femto cell $410_2$. In the example of FIG. 5, m=2.

Each femto cell 410 within the user-centric cell 420 effectively pre-authenticates the user so that when the user enters any of those femto cells 410 the user will immediately attach to it. In order to accomplish this, each femto cell 410 in the user-centric cell 420 must be supplied with sufficient information to authenticate the user's UE before the user actually enters any of them. Such authenticating information may vary from system to system, but generally includes all or a subset of the following: the user's Network Access Identifier (NAI), security credentials (e.g., authentication vector), a mobile MAC address, (or alternatively, an International Mobile Subscriber Identity (IMSI) or an International Mobile Equipment Identity (IMEI)), and the like. Note that an authentication vector comprises a set of security parameters that allows a network operator to authenticate (or re-authenticate) a UE, when and if necessary. For instance, the authentication vector in a UMTS cellular network includes a random number, an expected response, a cipher key, an integrity key, and an authentication token. Additional information that may be provided to each femto cell 410 in user-centric cell 420 includes information (e.g., the session context) relating to an ongoing communication session in the event that a communication session is in progress as the user moves from one femto cell to another. This information is provided to each femto cell 410 in the user-centric cell 420 by the ECONS CPE that is in the originating femto cell 410 in which the user is currently located. This ECONS CPE broadcasts the necessary information over an N hop wide neighborhood of femto cells 410. When an ECONS CPEs receives the authenticating information, it stores this data in its guest registrar (e.g., guest registrar 509 in FIG. 4) so that the data can be accessed when a user enters its femto cell. The information may be broadcast in the form of an authentication message.

The broadcast of the authenticating information takes place over the Internet or other broadband network through which all the ECONS CPEs are connected. For instance, in FIG. 3, the ECONS CPE 327 sends the authentication message to each of the other ECONS CPEs in its neighborhood through the core network 330 and the Internet 360 via broadband modem 329. This message serves to effectively establish or create the user-centric cell. In some implementations the authentication message may be sent to the neighboring ECONS CPEs using a flooding algorithm. When a flooding algorithm is employed, each ECONs CPE in the neighborhood acts as both a transmitter and receiver of the message. Each ECONS CPE tries to forward the message to each of its neighbors except the source ECONS CPE from which the message was received. In order to limit the message to N neighbors so that the user-centric cell has a radius of N femto cells, the message will generally also include a time-to-live (TTL) of N hops. As each neighbor's ECONS CPE receives the message it decrements the TTL by 1 before sending it on to its neighbors. In this way the process of forwarding the message terminates after it has been communicated to neighboring ECONS CPEs N hops away.

By communicating the user's authentication information to all the ECONS CPEs within N hops of the originating femto cell in which the user is located, the corresponding femto cells in which these ECONS CPEs are located will be able to accept packets to or from the user as soon as the user enters any of these femto cells. That is, the user's UE quickly attaches to any of the femto cells as she moves from femto cell to femto cell within the user-centric cell. Once the user is attached a particular femto cell, she will receive packets addressed for her through the ECONS CPE of that femto cell in which she is located. As the user moves m femto cells away from her originating femto cell, the ECONS CPE located in the femto cell in which the user is now located will rebroadcast the user's authentication information to its N hop neighbors. In this way the user-centric cell shifts so that in FIG. 5, for instance, user-centric cell 420 shifts to user-centric cell 420'. Accordingly, this technique ensures a smooth and rapid hand-off as the user moves from one femto-cell to another.

To ensure seamless mobility of the UE across the end-to-end infrastructure, the packets destined for the UE should be forwarded to the UE as it moves across the femto cells of a user-centric cell, changing its point of attachment to the network from one femto cell to another. Thus in addition to forwarding the authentication message to neighboring femto cells in the user-centric cell, the originating femto cell will broadcast to its neighboring femto cells any incoming packets addressed to the user as soon as the UE leaves the originating femto cell. This ensures that the user receives packets transmitted during a user-terminated communication session.

The authentication message that originated from a femto cell m hops away from the receiving femto cell will have a TTL of N-m. Once the user physically enters this receiving femto cell the femto cell (which now becomes a new originating femto cell) will reset the TTL back to N before forwarding it on to its neighboring femto cells. In this way the user-centric cell will always have a radius of N hops centered about the current location of the user. The new originating femto cell will also send a redirect message to the previous originating femto cell. The redirect message, which includes the IP address of the new originating femto cell, instructs the previous originating femto cell to stop broadcasting all incoming packets or messages destined for the user to its neighboring femto cells, and instead instructs the previous originating femto cell to simply route them to the new originating femto cell. Once the redirect message is received the previous originating femto cell will no longer broadcast any packets or messages destined for the user to all the femto cells in the user-centric cell, but will only forward such packets or messages to the new originating femto cell. In the context of FIG. 5, femto cell $410_1$ could be the previous originating femto cell and femto cell $410_2$ could be the new originating femto cell that the user subsequently enters.

In some cases the transmission of the redirect message may be initiated by the user's UE instead of by the ECONS CPE in the new originating femto cell. For instance, if the communication system is SIP-based and the session manager (e.g., session manager 503 in FIG. 4) is a SIP back to back user agent (B2BUA), the UE can send a SIP UPDATE message which "via" field contains the URL of the B2BUA of the ECONS CPE in the subsequent originating femto cell.

Since the user-centric cell is necessarily limited in coverage, at some point it will need to hand off the UE back to the cellular provider's macro cell. In order to accomplish this handoff, the ECON CPEs need to have sufficient knowledge about the topology of the femto-cells in order to instruct the UE in a timely manner to initiate the hand-off process to the macro cell. This information may be stored, for instance, in a database such as femto cell topology database 540 in the ECONS CPE of FIG. 4. For example, when a user attached to a user-centric cell of width N and within range of a macro cell is less than N hops away from an area in which there are no femto-cells to join the user-centric cell in the user's direction of movement, the ECONS CPE will instruct the user's UE to initiate a hand-off to the macro cell. In the case of a UMTS cellular network, the UE initiates the hand-off process to the macro cell by sending an attach message to the serving GPRS support node (SGSN). If this process is successful it is followed by initiation of a context activation process through the gateway GPRS support node (GGSN). The hand-off process to the macro cell will generally occur quickly since the user has already been authenticated by the AAA server of the cellular operator.

Figure 6:
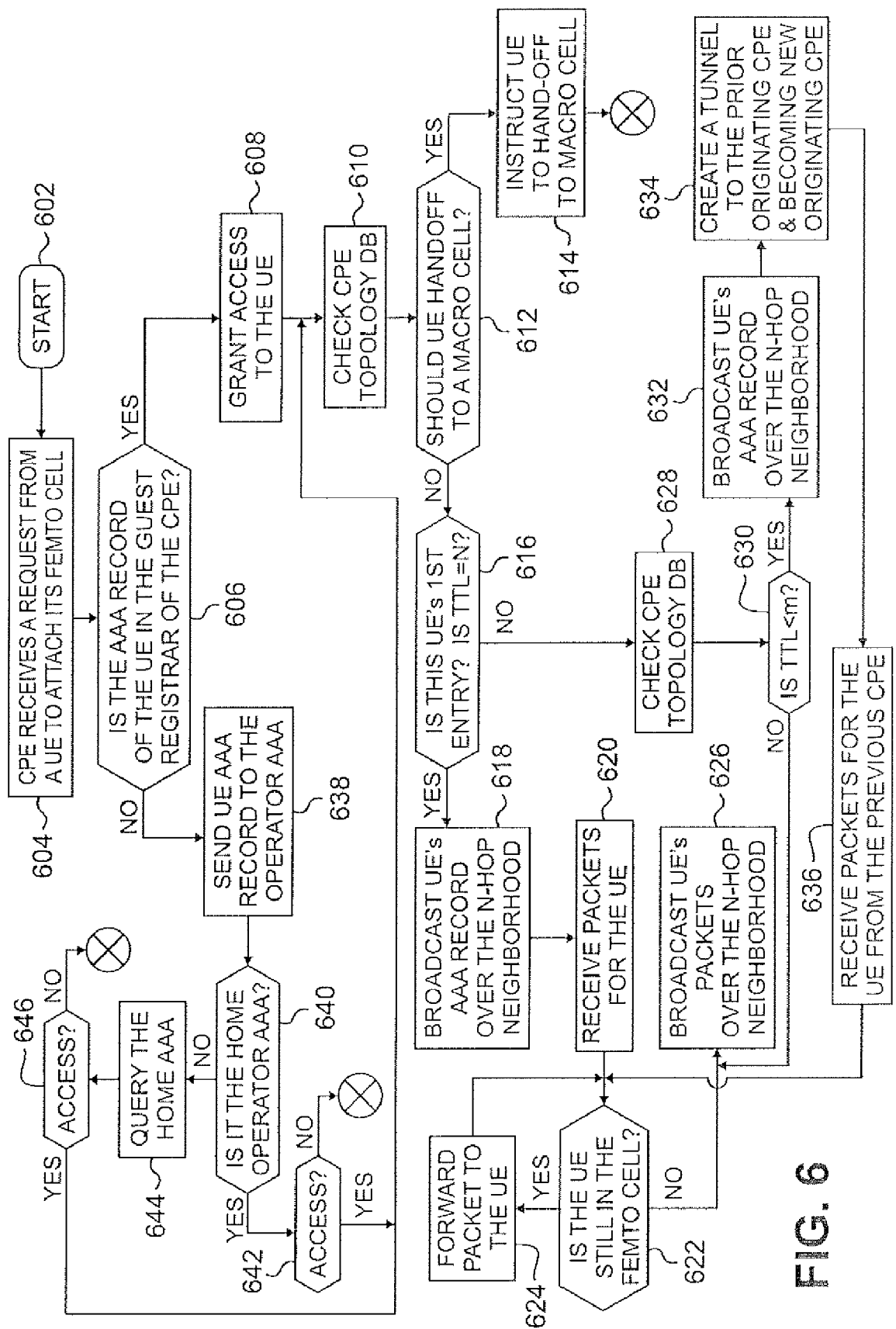
FIG. 6 is a flow chart illustrating one example of the hand-off process across individual femto cells in a femto cell overlay of an end-to-end ECONS network.

FIG. 6 is a flow chart illustrating one example of the hand-off process across individual femto cells in a femto cell overlay of an end-to-end ECONS network. The method begins in step 602 and continues to step 604 when an ECONS CPE receives a request from a UE to attach to the femto cell associated with the CPE. At decision step 606, the ECONS CPE determines if the AAA record of the UE is located in its guest registrar (e.g., guest registrar 509 shown in FIG. 4). If the AAA record is in the guest registrar, then the CPE grants access to the UE in step 608. Next, in step 610, the CPE checks its topology database (e.g., topology database 507 shown in FIG. 4) to determine, at decision step 612, whether or not the UE should undergo a hand-off to the macro cell. If yes, then the UE is instructed in step 614 to begin the handoff process to the macro cell, at which point the process terminates. On the other hand, if at decision step 612 the CPE determines that the UE should not be handed-off to the macro cell (based on the information in its topology database), the process continues to step 616, where the CPE determines if this is the UE's first entry into the femto cell overlay or if the TTL included with the authentication message is equal to N, which is the number of hops in the user-centric femto cell. If yes, then the process proceeds to step 618, where the CPE broadcasts the AAA record of the UE to the N hop neighborhood of femto cells. In addition, when the CPE receives packets destined for the UE at step 620, the CPE determines at step 622 if in fact the UE is still within the femto cell associated with the CPE. If so, the CPE forwards the packet to the UE at step 624. If the UE is not longer in the femtocell, then the CPE broadcasts the packet over the N hop neighborhood of femto cells in step 626. Returning to decision step 616, if the TTL of the authentication message is not equal to N, then in step 628 the CPE once again checks its topology database to determine at decision step 630 if the TTL in the authentication message is less than m, which is the number of hops the UE has moved from the original femto cell with which it attached. If the TTL is not less than m, the process returns to step 626 and any packets received for the UE are broadcast over the N hop neighborhood of femto cells. If, on the other hand, the TTL is less than m, the CPE broadcasts the AAA record of the UE over the N hop neighborhood of femto cells in step 632. In addition, the CPE creates a tunnel to the previous originating CPE and becomes the subsequent, new originating CPE in step 634 so that it will receive packets destined for the UE directly from the previous originating CPE in step 636. These packets received from the previous originating CPE in step 636 are then forwarded to the UE in step 624.

Returning to decision step 606, if the ECONS CPE determines that the AAA record of the UE is not located in its guest registrar, the CPE sends the AAA record to its network operator in step 638. Next, if it is determined in step 640 that the network operator is the UE's home operator, then in step 642 it is determined if the UE should be granted access to the femto cell, and, if so, the process continues to step 610 as described above. If in step 640 it is determined that the network operator is not the UE's home operator, the UE's home operator is queried in step 644 to determine, in step 646, if the UE should be given access to the femto cell. If so, the process once again continues to step 610 as described above. If not, the process once again terminates.

The steps of the processes described above, including but not limited to those shown in FIG. 6, may be implemented in a general, multi-purpose or single purpose processor. Such a processor will execute instructions, either at the assembly, compiled or machine-level, to perform that process. Those instructions can be written by one of ordinary skill in the art following the description provided herein and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), and/or packetized or non-packetized wireline or wireless transmission signals.

The invention claimed is:

1. A method for hand-off of a mobile User Equipment (UE) across a femto cellular network comprising:
    dynamically clustering a plurality of neighboring femto cells in a vicinity of a first femto cell to which a mobile UE is currently attached; and
    moving the dynamic cluster of neighboring femto cells across the femto cellular network in accordance with movement of the mobile UE across the femto cellular network.

2. The method of claim 1 wherein the mobile UE is pre-authenticated in each of the femto cells in a dynamic cluster by:
    creating an authentication message that includes information needed to authenticate and attach the UE to any of the plurality of neighboring femto cells in the cluster; and
    forwarding the authenticating message from the first femto cell to which the UE is currently attached to at least one neighboring femto cell in the cluster so that the UE is authenticated by the neighboring femto cell in the cluster without physically entering a geographic area served by the neighboring femto cell.

3. The method of claim 2 wherein the authenticating message is forwarded by a first Customer Premises Equipment (CPE) associated with the first femto cell to a second CPE associated with the neighboring femto cell.

4. The method of claim 3 wherein the authenticating message is broadcast by the first CPE to a plurality of second CPEs each associated with respective one of a plurality of neighboring femtocells in a cluster.

5. The method of claim 4 wherein the authenticating message is broadcast to the second CPEs using a flooding algorithm.

6. The method of claim 4 wherein the authenticating message is forwarded by the first CPE to the second CPE over a broadband network to which both CPEs are connected.

7. The method of claim 2 wherein the plurality of neighboring femto cells are all N hops or less away from the first femto cell and the authenticating message includes a time to live (TTL) of N hops.

8. The method of claim 2 further comprising:
    in response to receipt of the authenticating message by a first neighboring femto cell m<N hops away from the first femto cell in a cluster, attaching the UE to the first neighboring femto cell when the UE physically enters the geographic area served by the first neighboring femto cell without further authentication thereof; and
    forwarding the authentication message from the first neighboring femto cell to nearest neighbors of the first femto cell, wherein the TTL included in the authentication message is reset to N, when the TTL is less than N-m.

9. The method of claim 2 further comprising:
    in response to receipt of the authenticating message by a first neighboring femto cell 1 hop away from the first femto cell in the cluster, forwarding the authentication message from the first neighboring femto cell to nearest neighbors of the first femto cell within the cluster, wherein the time to live (TTL) included in the authentication message is decremented by 1.

10. The method of claim 2 further comprising broadcasting packets destined for the UE to CPEs associated with neighboring femto cells in the cluster when the UE is no longer attached to the first femto cell in the cluster.

11. The method of claim 10 further comprising receiving a redirect message from a second CPE associated with a neighboring femto cell in a second cluster to which the UE is currently attached, the redirect message instructing a first CPE associated with the first femto cell in the first cluster to terminate the broadcasting of the packets.

12. The method of claim 11 wherein the first CPE forwards packets destined for the UE to the second CPE in response to receipt of the redirect message from the second CPE.

13. The method of claim 3 wherein the first and second CPEs are Edge Convergence Server (ECONS) CPEs.

14. A Customer Premises Equipment (CPE), comprising:
    a wireless transceiver for establishing communication with a mobile User Equipment (UE) over a first femto cell to which the femto cell is currently attached;
    a network interface for establishing communication with a cellular network; and
    a session manager configured to forward over a broadband network an authentication message that includes information needed to authenticate and attach the UE to a plurality of femto cells neighboring the first femto cell so that the UE is authenticated by the neighboring femto cells without physically entering a geographic area served by the neighboring femto cell.

15. The CPE of claim 14 wherein the session manager is configured to broadcast the authenticating message by forwarding the authentication message to the CPEs associated with neighboring femto cells.

16. The CPE of claim 15 wherein the authentication message includes a Time-To-Live (TTL) of N hops, N>2, such that the TTL is decremented by 1 upon being received by the nearest neighbors.

17. The CPE of claim 14 further comprising a topology database configured to store a network topology defined by a series of femto cells that include the plurality of femto cells and one or more macro cells that overlap with the series of femto cells.

18. The CPE of claim 14 further comprising a guest registrar database configured to store identities and security credentials of any UEs already authenticated and granted access to the first femto cell.

* * * * *